United States Patent [19]

Meyer et al.

[11] 3,976,267

[45] Aug. 24, 1976

[54] VERTICAL GLIDE SLOPE CONTROL SYSTEM INCLUDING COMPLEMENTARY FILTER

[75] Inventors: David P. Meyer, Bellevue; Gordon F. Ellis, Redmond; Mohammad A. El-Moslimany, Seattle, all of Wash.

[73] Assignee: The Boeing Company, Seattle, Wash.

[22] Filed: Nov. 14, 1974

[21] Appl. No.: 523,680

[52] U.S. Cl. .............................. 244/186; 235/150.22; 343/108 R
[51] Int. Cl.² ......................................... B64C 13/18
[58] Field of Search .............. 73/178 T; 235/150.22; 244/77 A, 77 D; 318/583; 343/108 R

[56] References Cited
UNITED STATES PATENTS

| | | | |
|---|---|---|---|
| 3,223,362 | 12/1965 | Doniger | 244/77 A |
| 3,295,796 | 1/1967 | Gaylor | 244/77 A |
| 3,773,281 | 11/1973 | Doniger et al. | 244/77 A |
| 3,860,800 | 1/1975 | Simpson | 235/150.22 |
| R26,228 | 6/1967 | Larson | 244/77 D |

OTHER PUBLICATIONS

Bleeg, R. J. et al *Inertially Augmented Automatic Landing System*, FAA-RD-72-22, June 1971, pp. 1–228.

*Primary Examiner*—Stephen G. Kunin
*Attorney, Agent, or Firm*—Christensen, O'Connor, Garrison & Havelka

[57] ABSTRACT

A vertical glide slope control system including a complementary filter. Complementary aircraft generated and processed signals are added to a glide slope error signal which may include distortions. The results of the summation are applied to a first order lag filter having a low breakpoint (i.e., a low-pass band). The low-pass band eliminates high frequency distortions contained in the glide slope error signal without loss of stability. Aircraft stability is not lost due to the inclusion of the complementary aircraft signals added prior to the passage of the signals through the first order lag filter.

1 Claim, 3 Drawing Figures

VERTICAL GLIDE SLOPE CONTROL SYSTEM INCLUDING COMPLEMENTARY FILTER

BACKGROUND OF THE INVENTION

This invention is directed to aircraft autopilot systems and more particularly to aircraft autopilot systems utilized for automatically landing an aircraft.

In the past, various attempts have been made to provide autopilot systems suitable for controlling the landing of an aircraft. In general, these systems follow a glide slope beam toward a landing. While the prior art systems have been successful in some respects, a number of problems remain to be resolved. One of these problems relates to the beam distortions that may occur in the glide slope beam. By way of example, the glide slope beam may be distorted by large buildings surrounding the airport or by large aircraft moving in the vicinity of the airport. These distortions are received, along with the beam signal, by an aircraft attempting to follow the beam toward a landing and can cause the aircraft to change position rapidly. Such rapid aircraft maneuvers may be unsettling to the crew and passengers and, in some instances, may create dangerous landing situations. In any event, such beam distortions are changing and, generally, unpredictable. This invention is directed to overcoming such problems associated with the vertical (altitude) position of the aircraft.

Therefore, it is an object of this invention to provide a new and improved vertical glide slope control system.

It is a further object of this invention to provide a new and improved vertical glide slope control system suitable for use in aircraft automatic landing systems.

It is a still further object of this invention to provide a vertical glide slope control system suitable for use in aircraft automatic landing systems which eliminates unwanted effects of vertical glide slope beam distortions without degrading the stability of the aircraft.

SUMMARY OF THE INVENTION

In accordance with principles of this invention, a vertical glide slope control system including a complementary filter is provided. Complementary aircraft instrument generated signals are added to the altitude error signal which is derived from the glide slope error signal. The resultant signal is applied to a first order lag filter having a pass band low enough to eliminate high frequency distortions which may be associated with the glide slope error signal. In this manner the high frequency distortions are prevented from causing rapid changes in the altitude position of the aircraft. Yet, due to the addition of the complementary information, aircraft stability is not lost.

In accordance with further principles of this invention, ground speed, vertical acceleration and barometric altitude rate signals, all generated by the instruments of the aircraft, are applied to a signal processor. The signal processor includes a plurality of time constant and gain circuits. The time constant and gain circuits modify the received signals and, in accordance therewith, generate a complementary output signal(s). The complementary signal(s) is summed with the vertical glide slope error signal and the result is applied to the low-pass first order lag filter. The first order lag filter eliminates high frequency distortions from the complemented glide slope error signal. The output of the low-pass first order lag filter is an elevator command signal that controls the elevators of the aircraft.

It will be appreciated from the foregoing summary that the invention provides an improved vertical glide slope control system suitable for controlling the elevators of an aircraft during landing. The resultant elevator command signal is formed such that vertical distortion errors contained in the glide slope error signal are eliminated without loss of aircraft stability. Aircraft stability is not lost because complementary information derived from aircraft sensors is added to the glide slope error signal prior to removal of vertical glide slope error distortions.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
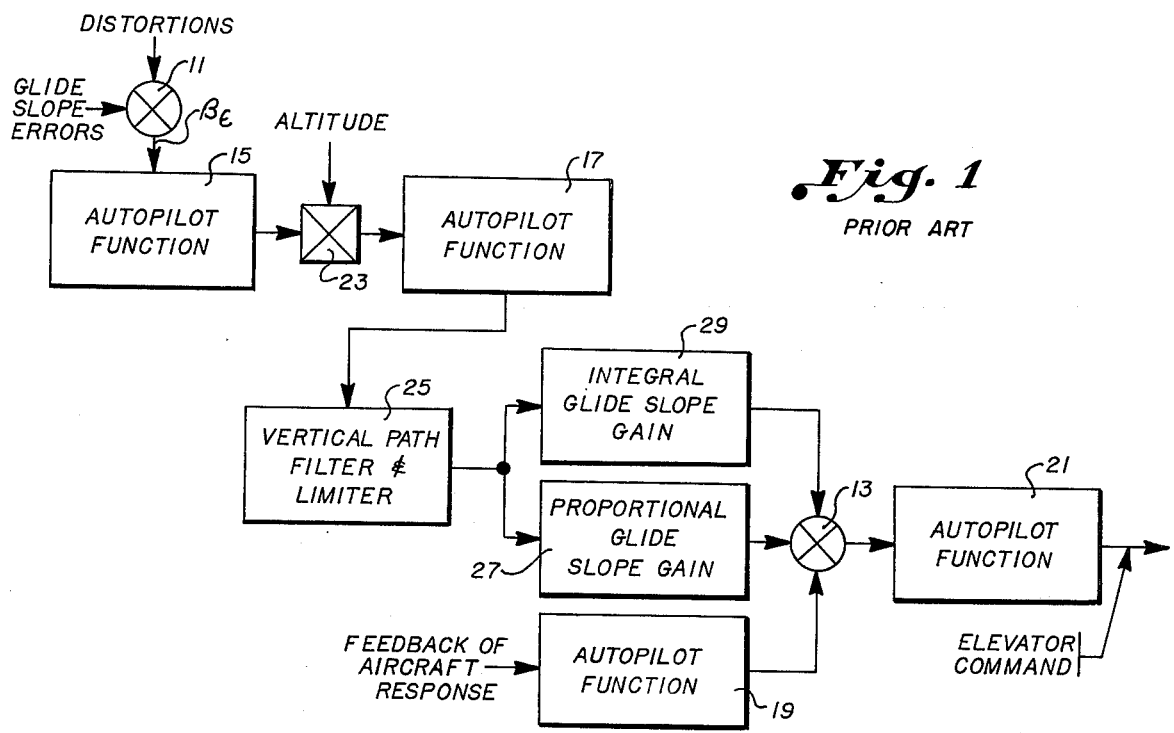
FIG. 1 is a block diagram illustrating a prior art glide slope control system.

FIG. 1 illustrates a prior art glide slope control system and includes: a two-input summer 11; a three-input summer 13; four autopilot function circuits 15, 17, 19 and 21; a multiplier 23; a vertical path filter and limiter circuit 25; a proportional glide slope gain circuit 27; and, an integral glide slope gain circuit 29. Glide slope errors and distortions are schematically illustrated as being applied to the two inputs of the first summer 11. In actuality, a single signal that includes glide slope error and distortions is generated by the ILS (instrument landing system) receiver of the aircraft. This signal, designated $\beta_\epsilon$, is applied to the input of the first autopilot function circuit 15. The first autopilot function circuit 15 may be any one of a number of different types of time constant, filter, gain, limiting, etc., circuits well known to those skilled in the art. In one form it is a band-pass filter designed to eliminate distortions falling outside of a relatively wide band.

The output from the first autopilot function circuit 15 is applied to one input of the multiplier 23. An altitude signal generated by a suitable aircraft instrument, such as a radio altimeter, for example, is applied to the second input of the multiplier 23. Thus, the output of the multiplier 23 is a glide slope error plus distortion signal in terms of altitude; or, more precisely, a gain programmed beam error plus distortion signal. This signal is applied to the input of the second autopilot function circuits 17. The second autopilot function circuit modifies its input in any suitable manner well known to those skilled in the art. For example, the second autopilot function circuit may be an amplifier that merely adds gain to its input.

The output from the second autopilot function circuit 17 is connected to the input of the vertical path filter and limiter 25. The vertical path filter and limiter filters the output of the second autopilot function circuit 17 and limits the level of the output of second autopilot function circuit to an acceptable level.

The output of the vertical path filter and limiter 25 is connected to the input of the proportional glide slope gain circuit 27 and to the input of the integral glide slope gain circuit 29. The proportional glide slope gain circuit amplifies its input by a suitable gain factor $K_p$, and the integral glide slope gain circuit integrates its input and adds gain to it. Thus, the integral glide slope gain circuit performs the mathematical function $K_I/s$ where $K_I$ is the gain factor and s is the laplace operator. The outputs of the integral and proportional glide slope gain circuits are applied to two of the inputs of the three-input summer 13.

A feedback signal related to aircraft response to elevator commands is applied to the input of the third autopilot function circuit 19. The third autopilot function circuit 19 may be a time constant, filter, gain, etc., circuit, as necessary. The output of the third autopilot function circuit is applied to the third input of the three-input summer 13. Thus, the three-input summer 13 receives a signal related to aircraft response and signals related to vertical glide slope error, including distortions. The output of the three-input summer 13 is applied to the input of the fourth autopilot function circuit 21. As with the other autopilot function circuits, the fourth autopilot function circuit 21 may be any one of a number of different types of circuits well known to those skilled in the art, such as a gain circuit, for example. In any event, the output of the fourth autopilot function circuit 21 forms an elevator command signal that is applied to the elevators of the aircraft via a suitable electromechanical coupling arrangement.

In general, as will be appreciated from the foregoing description, the vertical glide slope control system illustrated in FIG. 1 generates an information signal relating to vertical errors between the aircraft's actual position and its desired position on the glide slope path at any particular point on the path. Vertical beam distortions, if they exist, are contained in this signal. The signal is amplified and integrated. The results of the integration and amplification are summed with a feedback signal to create elevator command signals suitable for controlling the elevators. In accordance with the thusly generated elevator command signals, the aircraft is brought to and maintained at its desired vertical (altitude) position along the glide slope beam. Thus, the aircraft follows the "beam" until it lands on the runway.

The problem with vertical glide slope control systems of the type generally illustrated in FIG. 1 is that distortions in the glide slope error signal can cause changes in aircraft altitude. Such changes often tend to be rapid because the distortions often contain relatively high frequency components. Rapid changes created in this manner can be upsetting to the crew and passengers of the aircraft and, in some instances, may be hazardous to landing. The invention is directed to eliminating these problems by complementing the glide slope error signal with aircraft instrument derived signals and filtering the resultant signal to eliminate all high frequency components.

Figure 2:
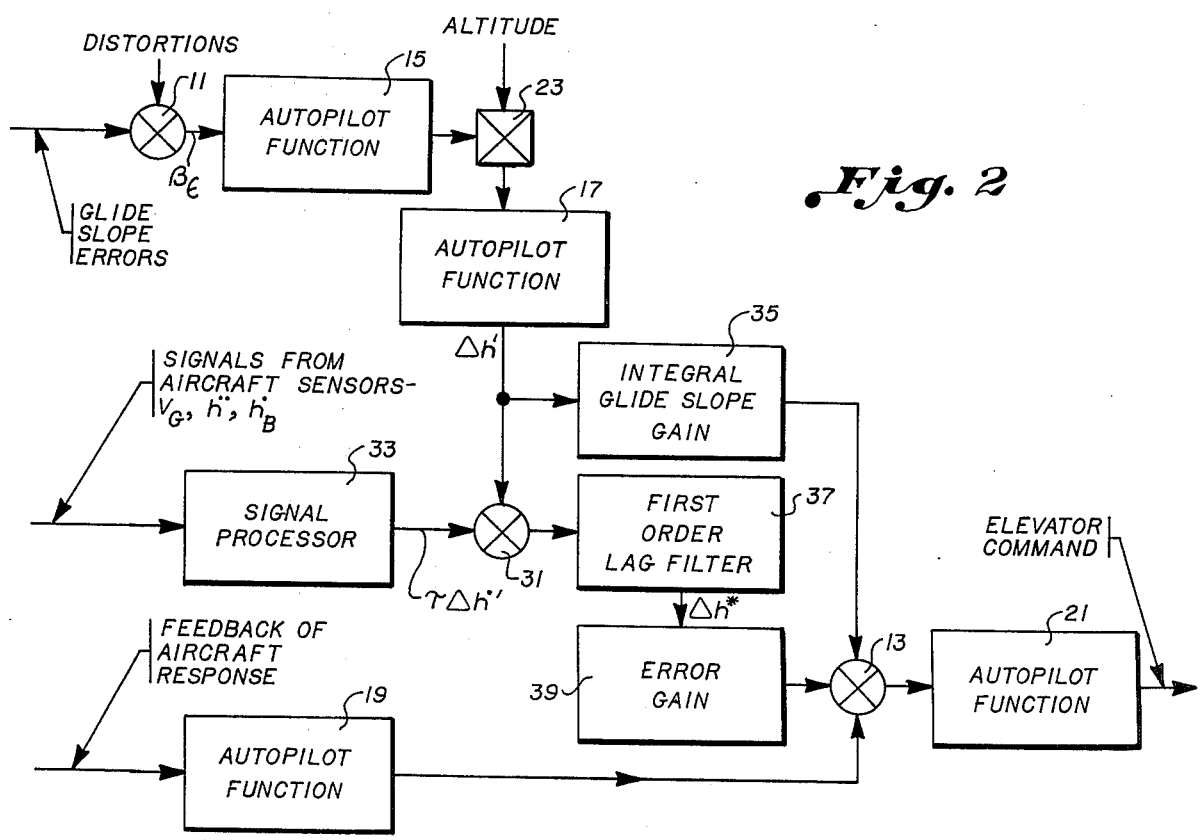
FIG. 2 is a block diagram illustrating a preferred embodiment of a glide slope control system formed in accordance with this invention; and, FIG. 3 is a block diagram illustrating in more detail a preferred embodiment of a glide slope control system formed in accordance with the invention.

FIG. 2 is a block diagram generally illustrating a preferred embodiment of the invention that includes some of the elements illustrated in FIG. 1, plus some additional elements. The elements similar to those used in FIG. 1 are: the two-input and three-input summers 11 and 13; the four autopilot function circuits 15, 17, 19 and 21 (modified as necessary to conform to the invention, as hereinafter described); and, the multiplier 23. The additional elements illustrated in FIG. 2 comprise: a second three-input summer 31; a signal processor 33; an integral glide slope gain circuit 35; a first order lag filter 37; and error gain circuit 39. The internal glide slope gain circuit 35 is generally similar to the integral glide slope gain circuit 29 illustrated in FIG. 1, except that it may have a slightly different gain. Thus, it performs the mathematic function $K'_I/s$, where $K'_I$ is the gain and s is the laplace operator.

As with the prior art device illustrated in FIG. 1, glide slope errors and distortions are summed by the first summer 11 to form the glide slope error signal $\beta_\epsilon$. Thus, this signal includes distortions as well as glide slope error information. $\beta_\epsilon$ is applied to the input of the first autopilot function circuit 15 which modifies the signal in the manner previously described. The output of the first autopilot function circuit 15 is applied to one input, and an altitude information signal is applied to the second input, of the multiplier 23. The output of the multiplier 23 is applied to the input of the second autopilot function circuit 17. The output of the second autopilot function circuit is designated $\Delta h'$. This signal represents glide slope errors and distortions in terms of altitude. While not illustrated, the output of the second autopilot function circuit may pass through a vertical path filter and limiter prior to the $\Delta h'$ signal being formed, or these functions may be performed by the second autopilot function circuit 17, as desired. The $\Delta h'$ signal is applied to one input of the second two-input summer 31 and to the input of the integral glide slope gain circuit 35. The integral glide slope gain circuit 35 may have a different gain than the integral glide slope gain circuit 29 illustrated in FIG. 1, as described above.

Processed information signals derived from the aircraft's sensors, such as signals related to ground speed ($V_G$), rate of altitude change as sensed by a barometric altitude rate sensor ($\dot{h}_B$) and vertical acceleration ($\ddot{h}$) are applied to the signal processor 33. The signal processor 33 is generally a time constant circuit and processes these signals so as to generate a rate change signal designated $\tau\Delta\dot{h}'$. This signal includes information which complements information contained in the $\Delta h'$ signal if it is truly related to the $\Delta h'$ signal as it should be. $\tau\Delta\dot{h}'$ is applied to the second input of the second two-input summer 31. Thus, the output of the second two-input summer is $\Delta h' + \tau\Delta\dot{h}'$. The output from the third summer 31 is applied to the input of the first order lag filter 37. The output of the first order lag filter 37 is designated $\Delta h^*$. If $\Delta\dot{h}'$ and $\Delta h'$ are truly related, the $\Delta h^*$ should be equal to $\Delta h'$. Thus, mathematically, $$\frac{1}{\tau s + 1}(\Delta h' + \tau\Delta\dot{h}') = \Delta h^*$$

$$\frac{\Delta h' + \tau s \Delta h'}{\tau s + 1} = \Delta h^*$$

$$\Delta h' \frac{1 + \tau s}{\tau s + 1} = \Delta h^*$$

$$\Delta h' = \Delta h^*$$

The foregoing mathematical proof shows that $\Delta h^*$ is mathematically equivalent to $\Delta h'$. However, any distortions above ($1/\tau$) rad/sec have been attenuated and, thus, removed. Such attenuated signals have been replaced by information desired from the $\tau\Delta\dot{h}'$ signal. In other words, while undesired high frequency components of $\Delta h'$ have been eliminated, all of the information necessary to command the elevators of the aircraft to cause the aircraft to follow a desired glide slope exists in $\Delta h^*$.

The $\Delta h^*$ signal is applied to the input of the error gain circuit 39. The output of the error gain circuit 39 is applied to the second input of the three-input summer 13. The feedback of aircraft response signal from the third autopilot function circuit 19 is applied to the third input of the three-input summer 13. The output of the three-input summer 13 is applied to the input of the fourth autopilot function circuit 21 and creates the elevator command signal.

It will be appreciated from the foregoing discussion and viewing FIG. 2 that the invention provides a system for eliminating unwanted high frequency distortion (noise) signals from the glide slope error signal and replaces any information lost during the elimination of these signals with information derived from aircraft sensor signals.

Figure 3:
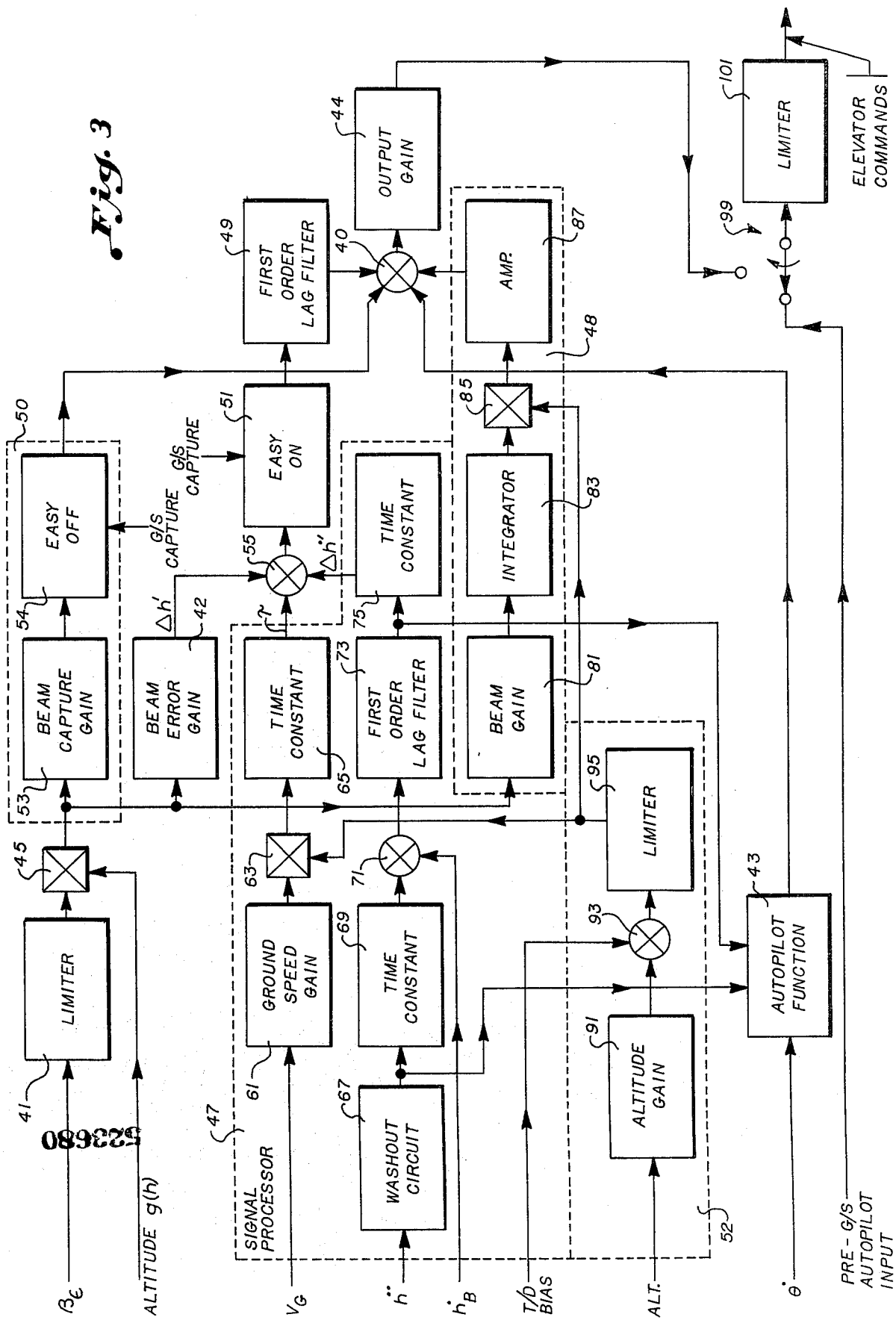

FIG. 3 is a block diagram illustrating, in somewhat more detail, a preferred embodiment of the invention and comprises a four-input summer 40; a limiter 41; a beam error gain circuit 42; an autopilot function circuit 43; an output gain circuit 44; a multiplier 45; a signal processor 47; an integral glide slope gain circuit 48; a first order lag filter 49; a glide slope capture circuit 50; an easy-on circuit 51 which also is utilized during glide slope capture; and, a touchdown circuit 52.

The glide slope error plus distortion signal $\beta_\epsilon$ is applied through the limiter 41 which forms the previously described first autopilot function circuit 15 to one input of the multiplier 45. An altitude function signal, $g(h)$, generated by the altimeter of the aircraft is applied to the second input of the multiplier 45. The output of the multiplier 45 is applied to: the glide slope capture circuit 50; the beam error gain circuit 42; and, the integral glide slope gain circuit 48.

The glide slope capture circuit 50 comprises a beam capture gain circuit 53, having a gain designated $K_B$, and an easy-off circuit 54. The beam gain circuit 53 raises the glide slope error signal to an appropriate level and applies the raised signal to the easy-off circuit 54. The output of the easy-off circuit is applied to one input of the four-input summer 40. The easy-off circuit 54 is under the control of a glide slope capture signal generated by a suitable well-known means, such as a switch. When it is desired to "capture" the glide slope beam, the easy-off circuit reduces the output of the beam capture gain circuit 53 to zero over a predetermined period of time, such as 10 seconds, for example. This "easy-off" transition prevents a rapid altitude change from occurring when the apparatus of the invention is switched from a beam capture mode of operation to a glide slope control system mode of operation. That is, as will be better understood from the following description, as the easy-off circuit 54 terminates the beam capture mode of operation, the easy-on circuit 51 begins the glide slope control system mode of operation.

The beam error gain circuit 42 performs the function of the second autopilot function circuit 17 illustrated in FIG. 2 and heretofore described, and has a gain designated $K_{\Delta h}$. Thus, the output of the beam error gain circuit 42 is the $\Delta h'$ signal. This signal is applied to one input of a three-input summer 55.

The signal processor 47 comprises: a ground speed gain circuit 61 having a gain designated $K_{V_G}$; a second multiplier 63; a first time constant circuit 65 having a gain designated $K_{\Delta \dot{h}}$; a time constant designated $\tau_{\Delta \dot{h}}$ for a total circuit designated of $K_{\Delta \dot{h}} \tau_{\Delta \dot{h}}$; a washout circuit 67; a second time constant circuit 69 having a time constant designated $\tau_C$, a two-input summer 71; a second first-order lag filter 73; and, a third time constant circuit 75 also having a total circuit designation $K_{\Delta \dot{h}} \tau_{\Delta \dot{h}}$.

An aircraft instrument generated ground speed signal ($V_G$) is applied through the ground speed gain circuit to one input of the second multiplier 63. The output of the touchdown circuit 52, generated in the manner hereinafter described, is applied to the second input of the second multiplier 63. The output of the second multiplier 63 is applied through the first time constant circuit 65 to the second input of the three-input summer 55.

An aircraft instrument generated vertical acceleration signal, $\ddot{h}$, is applied through the washout circuit 67 and the second time constant circuit 69, connected in series, to one input of the two-input summer 71. A barometric altitude rate signal, $\dot{h}_B$, also generated by the instruments of the aircraft, is applied to the second input of the two-input summer 71. The output of the two-input summer 71 is applied through the first-order lag filter 73 and the third time constant circuit, connected in series, to the third input of the three-input summer 55. The second and third inputs of the three-input summer 55 form the $\tau \Delta \dot{h}$ signal described above.

The output of the three-input summer 55 is applied to the input of the easy-on circuit 51. As with the easy-off circuit 54, the easy-on circuit is controlled by a glide slope capture signal. Once this signal occurs, the easy-on circuit raises its output from zero to the level of its input over a predetermined period of time, such as 10 seconds, for example. The output of the easy-on circuit 51 is applied to the input of the first order lag filter 49. The output of the first order lag filter is applied to the second input of the four-input summer 40. While not shown, if desired, a gain circuit 39 of the type illustrated in FIG. 2 can be included between the output of the three-input summer 55 of the associated input of the four-input summer 40.

The integrator with gain circuit 48 comprises: a beam gain circuit 81 having a gain designated $K_{B_I}$; an integrator 83; a third multiplier 85; and an amplifier 87. The amplifier is another gain circuit having, preferably, an amplification or gain ratio of 2.0.

The output from the first multiplier 45 is applied to the input of the beam gain circuit 81. It is noted here that, while in FIG. 2 the input to the integral glide slope gain circuit is the output of the second autopilot function circuit 17 rather than the output of the multiplier, this change makes no difference since the signal character is the same at both points, the only difference between the two signals being their voltage levels.

The output of the beam gain circuit 81 is applied through the integrator 83 to one input of the third multiplier 85. The output of the touchdown circuit 52 is applied to the second input of the third multiplier 85. The output of the third multiplier 85 is applied through the amplifier 87 to the third input of the four-input summer 40.

The touchdown circuit 52 comprises: an altitude gain circuit 91; a second two-input summer 93; and a second limiter 95. An aircraft instrument generated altitude signal is applied through the altitude gain circuit 91 to one input of the second two-input summer 93. The altitude gain circuit has a gain designated $K_{h_F}$. A touchdown (T/D) bias signal having a suitable voltage level such as −4.82 volts (giving −1.0fps $\dot{h}_{CMD}$ at $h_R = 0$) is applied to the second input of the second two-input summer 93. The output of the second two-input summer 93 is applied through the limiter to the second input of the second multiplier 63 and to the second input of the third multiplier 85, as previously described. In essence, the touchdown circuit is basically a built-in bias circuit having an output signal which is related to altitude and is utilized as a control signal by the signal processor 47 and the integral glide slope gain circuit 48. The output of the touchdown circuit is normally constant and, thus, has no effect on the signal processor and the integral glide slope gain circuit. This changes just prior to landing when the touchdown circuit causes the aircraft to "flair out," so that it will land horizontally. This action occurs because the limited output of the touchdown circuit starts to drop to zero just prior to landing.

The autopilot function 43 receives a signal, $\dot{\theta}$, which represents the rate of angular displacement of the aircraft with respect to a fixed reference. This angular displacement signal is combined with the output of the washout circuit 67 and the output of the first-order lag filter 73 forming part of the signal processor 43. The output of the autopilot function circuit is a signal which is related to aircraft response and, thus $\dot{\theta}$ comprises the feedback of aircraft response signal previously described. The output of the autopilot function circuit 43 is applied to the fourth input of the four-input summer 40.

The output of the four-input summer 40 is applied through the output gain circuit, which has a gain designated as $K_{h_e}$ to one remote terminal of a single pole-double throw switch 99. The other remote terminal of the switch 99 is connected to receive a signal from a pre-glideslope autopilot source. The common terminal of the switch 99 is connected to the input of a third limiter 101. The output of the third limiter is the elevator command signal and controls the elevators of the aircraft via a suitable electromechanical mechanism.

Turning now to a description of the operation of the embodiment of the invention illustrated in FIG. 3, initially the pre-glideslope autopilot input signal is being applied through the switch 99 to the limiter and, thus, creates the elevator command signals. When a landing is to be made, and the aircraft is in a position suitable for receiving the glideslope beam signal, the switch is activated to connect its common terminal to the output of the output gain circuit 44. Prior thereto, or at the same time, the easy-off circuit 54 is activated to apply its input to the four-input summer 40 and the easy-on circuit 51 is activated to inhibit the application of its input to the four-input summer. At this point the system is in its beam capture mode of operation. After the glideslope beam signal is captured, in any suitable manner well-known in the art, the output of the easy-off circuit drops to zero over a predetermined period of time such as 10 seconds. Over the same period of time the output of the easy-on circuit builds up from zero. Thus, a smooth transition from the beam capture mode of operation to the glide-slope mode of operation is provided. This smooth transition prevents rapid aircraft altitude changes during the transition period.

After the transition takes place, the signal processor processes its input signals so as to continuously create the complementary signal $\tau\Delta\dot{h}'$. This signal is combined with the beam error signal $\Delta h'$, and the results of the summation are filtered by the first-order lag filter 49 to eliminate high frequency distortion components. Thus, the output is a relatively low frequency signal that is used to create elevator commands that maintain the aircraft on the glide slope beam, with respect to altitude. Because high frequency distortion components have been eliminated, the aircraft has no tendency to rapidly change altitude in an attempt to "follow" such distortion components.

By way of illustration, the following gain values and time constants have been found to be suitable for use in one actual embodiment of the invention, even though other gain values and time constants can be utilized, as necessary.

$K_B = 108$
$K_{\Delta h} = 179$
$K_V = 0.0885$
$K_h = 0.905$
$K_{\dot{h}} = 2.0$
$K_B = 7.2$
$\tau_c = 20.0$
$\tau_{\Delta h} = 15.0$ sec.
$K_{\Delta \dot{h}} \tau_{\Delta h} = 4.5$ The corresponding first order lags associated with these gains are given below:

For the first order lag filter forming part of the signal processor:

$$1/\tau_c s + 1$$

where $\tau_c = 20.0$ sec.

For the other first order lag filter:

$$1/\tau_{\Delta h} s + 1$$

where $\tau_{\Delta h} = 15.0$ sec.

It will be appreciated by those skilled in the art and others that while a preferred embodiment of the invention has been illustrated and described, various changes can be made therein without departing from the spirit and scope of the invention. Hence, the invention can be practiced otherwise than as specifically described herein.

The embodiments of the invention in which an exclusive property or privilege is claimed are defined as follows:

1. A vertical glide slope control system for use in an aircraft automatic landing system, wherein a glide slope beam is followed by an aircraft toward a landing, to control the vertical movement of the aircraft, said vertical glide slope control system comprising:
   a. a first limiter for receiving and limiting glide slope error plus distortion signals received by said aircraft;
   b. a first two-input multiplier having one input connected to the output of said first limiter and a second input for receiving altitude related signals produced by the instruments of said aircraft;
   c. a glide slope capture circuit comprising:
      1. a beam capture gain circuit connected to the output of said first two-input multiplier; and,
      2. an easy-off circuit connected to the output of said beam capture gain circuit for reducing the output of said beam capture gain circuit to zero, over some predetermined time period, upon the receipt of a glide slope capture control signal;

d. a touchdown circuit comprising:
1. an altitude gain circuit for amplifying altitude related signals produced by the instruments of said aircraft;
2. a first two-input summer having one input connected to the output of said altitude gain circuit and a second input for receiving a touchdown bias signal; and,
3. a second limiter having its input connected to the output of said first two-input summer for limiting the output of said first two-input summer;

e. an integral glide slope gain circuit comprising:
1. a beam gain circuit having its input connected to the output of said first two-input multiplier for amplifying the output of said first two-input multiplier;
2. an integrator havings its input connected to the output of said beam gain circuit for integrating the output of said beam gain circuit;
3. a second two-input multiplier having one input connected to the output of said integrator and the second input connected to the output of said second limiter; and,
4. an amplifier having its input connected to the output of said second two-input multiplier;

f. a signal processor comprising:
1. a ground speed gain circuit for receiving and amplifying an aircraft instrument produced signal related to the ground speed of said aircraft;
2. a third two-input multiplier having one input connected to the output of said ground speed gain circuit and a second input connected to the output of said second limiter;
3. a first time constant circuit connected to the output of said third two-input multiplier for delaying the output of said third two-input multiplier;
4. a wash-out circuit for receiving an aircraft instrument produced signal related to the vertical acceleration of said aircraft;
5. a second time constant circuit connected to the output of said wash-out circuit for delaying the output of said wash-out circuit;
6. a second two-input summer having one input connected to the output of said second time constant circuit and a second input for receiving an aircraft instrument produced barometric altitude rate signal related to the rate of altitude change of said aircraft;
7. a first first-order lag filter connected to the output of said second two-input summer; and,
8. a third time constant circuit connected to the output of said first-order lag filter for delaying the output of said first first-order lag filter;

g. a beam error gain circuit connected to the output of said first multiplier for amplifying the output of said first multiplier;

h. a three-input summer having its first input connected to the output of said beam error gain circuit; its second input connected to the output of said first time constant circuit; and, its third input connected to the output of said third time constant circuit;

i. an easy-on circuit connected to the output of said three-input summer and suitable for increasing the output of said three-input summer from zero to the level of the output of said three-input summer, over some predetermined time period, upon the receipt of a glide slope capture control signal;

j. a second first-order lag filter connected to the output of said easy-on circuit;

k. an autopilot function circuit for receiving and combining the output of said wash-out circuit and the output of said first first-order lag filter with an aircraft instrument produced signal related to the rate of angular displacement of said aircraft;

l. a four-input summer having one input connected to the output of said second first-order lag filter; a second input connected to the output of said easy-off circuit; a third input connected to the output of said autopilot function circuit; and a fourth input connected to the output of said amplifier; and, m. an output gain circuit having its input connected to the output of said four-input summer, the output of said gain circuit being adapted to control the vertical movement of said aircraft in accordance with the aircraft instrument produced signals applied to the inputs of said vertical glide slope control system in a manner such that the effect of high frequency distortions in said glide slope error signal received by said first limiter are substantially eliminated.

* * * * *